United States Patent
Van den Bergh et al.

(10) Patent No.: US 6,822,243 B2
(45) Date of Patent: Nov. 23, 2004

(54) PHOSPHOR PANEL WITH A PROTECTIVE LAYER

(75) Inventors: Rudi Van den Bergh, Lint (BE); Paul Leblans, Kontich (BE); Ludo Joly, Hove (BE); Luc Struye, Mortsel (BE)

(73) Assignee: AGVA-Gevaert, Mortsel (BE)

( * ) Notice: Subject to any disclaimer, the term of this patent is extended or adjusted under 35 U.S.C. 154(b) by 152 days.

(21) Appl. No.: 10/113,252

(22) Filed: Apr. 1, 2002

(65) Prior Publication Data
US 2003/0071228 A1 Apr. 17, 2003

Related U.S. Application Data

(60) Provisional application No. 60/322,612, filed on Sep. 17, 2001.

(30) Foreign Application Priority Data

Aug. 23, 2001 (EP) .............................. 01000401
Mar. 26, 2002 (EP) .............................. 02100297

(51) Int. Cl.$^7$ .............................................. G02B 42/08
(52) U.S. Cl. .................................................. 250/484.4
(58) Field of Search ....................................... 250/484.4

(56) References Cited

U.S. PATENT DOCUMENTS 4,741,993 A * 5/1988 Kano et al. ............... 250/484.4
5,466,947 A * 11/1995 Fleig et al. ............... 250/484.4
6,232,611 B1 * 5/2001 Suzuki et al. ............ 250/483.1

* cited by examiner

Primary Examiner—Constantine Hannaher
(74) Attorney, Agent, or Firm—Joseph T. Guy; Nexsen Pruet, LLC

(57) ABSTRACT

A phosphor panel with a protective coating divided in at least two layers: a layer A, being closest to said phosphor layer and a layer B farther away from said phosphor layer wherein the layer A has a lower water vapor permeability coefficient than the layer B. Layer A has a water vapor permeability coefficient, P, so that $$0 \leq P \leq 1 \times 10^{-11} \frac{cm^3 (STP) \cdot cm}{cm^2 \cdot s \cdot Pa}.$$

15 Claims, 1 Drawing Sheet

PHOSPHOR PANEL WITH A PROTECTIVE LAYER

This application claims the benefit of provisional application 60/322,612, filed Sep. 17, 2001.

FIELD OF THE INVENTION

The present invention relates to a phosphor panel with a protective layer.

BACKGROUND OF THE INVENTION

A well-known use of phosphors is in the production of X-ray images. In a conventional radiographic system an X-ray radiograph is obtained by X-rays transmitted image-wise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

According to another method of recording and reproducing an X-ray pattern as disclosed e.g. in U.S. Pat. No. 3,859,527 a special type of phosphor is used, known as a photostimulable phosphor, which being incorporated in a panel, is exposed to incident pattern-wise modulated X-ray beam and as a result thereof temporarily stores energy contained in the X-ray radiation pattern. At some interval after the exposure, a beam of visible or infra-red light scans the panel to stimulate the release of stored energy as light that is detected and converted to sequential electrical signals which can be processed to produce a visible image. For this purpose, the phosphor should store as much as possible of the incident X-ray energy and emit as little as possible of the stored energy until stimulated by the scanning beam. This is called "digital radiography" or "computed radiography".

In both kinds of radiography it is preferred to be able to choose the phosphor that will be used on the basis of its speed and image quality without having to bother about its hygroscopicity.

Therefore it is highly desired to have the possibility of producing a phosphor panel, be it for use in direct radiography or in computed radiography, that is impervious to water vapour. In U.S. Pat. No. 4,741,993 a radiation image storage panel is disclosed having at least one stimulable phosphor layer on a support and a protective layer provided on the stimulable phosphor layer, wherein the protective layer comprises at least two layers of which regains under a relative humidity of 90% on a sorption isotherm at 25° C. are different by 0.5% or more. According to the present invention, a radiation image storage panel which has good humidity resistance and can be used for a long term is obtained. Although a protective layer as disclosed in U.S. Pat. No. 4,741,993 does provide good humidity protection, the need for providing phosphor panels with even better humidity resistance is still present.

Use of parylene layers as humidity protective layers in photo-stimulable phosphor screens has been disclosed in e.g. EP-Application No. 01000401.8, filed Aug. 23, 2001. Also in DE-A-196 25 912 and GB-A-2 287 864 phosphor screens containing a parylene layer are disclosed.

Although screens prepared according to the disclosures above do yield screens with acceptable to very good overall quality, the need for a phosphor screen combining good humidity resistance and good resistance against physical damage during use is still present.

OBJECTS AND SUMMARY OF THE INVENTION

It is an object of the present invention to provide a phosphor panel with very high humidity resistance.

It is further object of the present invention to provide a binderless storage phosphor panel with very high humidity resistance.

The above mentioned objects are realized by providing a phosphor panel having the specific features defined in claim 1. Specific features for preferred embodiments of the invention are disclosed in the dependent claims.

Further advantages and embodiments of the present invention will become apparent from the following description.

DETAILED DESCRIPTION OF THE INVENTION

Figure 1A:
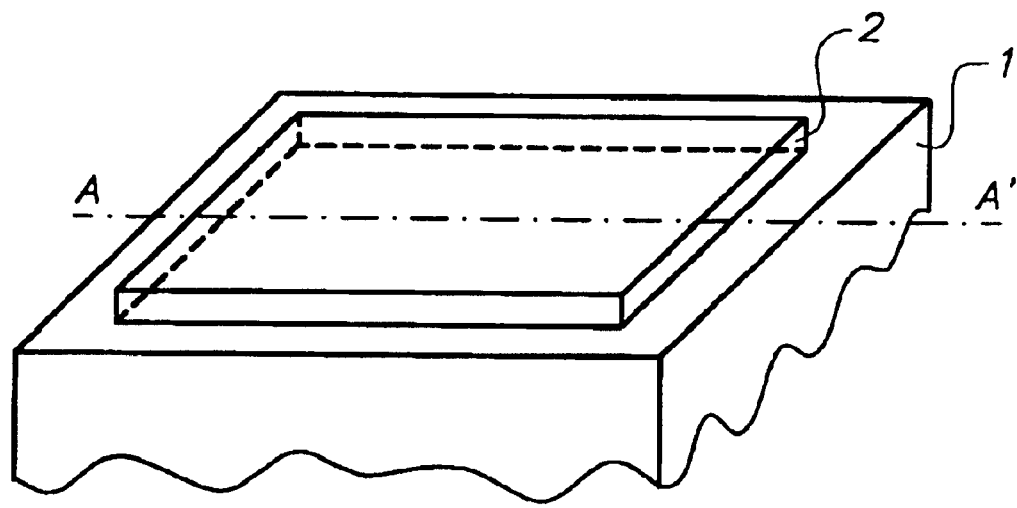
In FIG. 1A a schematic view of an embodiment of a panel according to the present invention is shown. (not on scale).
Figure 1B:
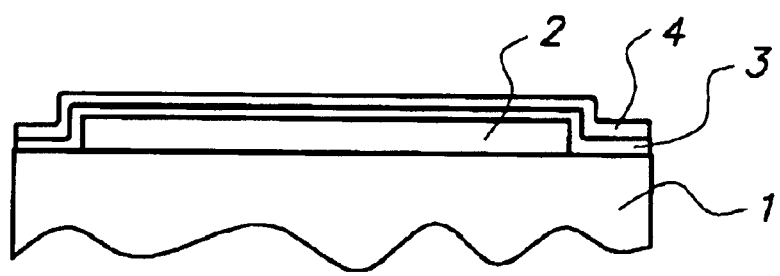
In FIG. 1B a cross section along the line A–A' of FIG. 1A is shown.

It was found now that, contrary to the teaching of U.S. Pat. No. 4,741,993, a phosphor panel with a protective layer—divided in at least two layers, a layer A being closest to the phosphor layer and a layer farther away from the phosphor layer—could better be protected against the influence of moisture and of physical damage when the layer A of the protective layer had a lower water vapour permeability coefficient than the said layer B. Water vapour permeability has been measured according to ASTM E96-00.

According to the present invention a phosphor panel has thus been provided, wherein said panel comprises a phosphor layer and a protective layer, wherein the phosphor layer has a main surface and edges, and which is characterized in that said protective layer is divided into at least two layers, being a layer A, closest to said phosphor layer and a layer B, farther away from said phosphor layer; and wherein said layer A has a lower water vapour permeability coefficient than said layer B.

The layer A in a Phosphor Panel of the Present Invention

Preferably the layer A of the protective layer, in the phosphor panel of the present invention, has a water vapour permeability coefficient, P, so that $$0 \le P \le 1 \times 10^{-11} \frac{cm^3(STP) \cdot cm}{cm^2 \cdot s \cdot Pa}.$$

More preferably the layer A has a water vapour permeability coefficient, P, so that $$0 \le P \le 1 \times 10^{-12} \frac{cm^3(STP) \cdot cm}{cm^2 \cdot s \cdot Pa}.$$

The "water vapour permeability coefficient", P, used in this disclosure in order to define the water vapour permeability is the "water vapour permeability coefficient", P, as described in the Polymer Handbook, third edition, editors J. Brandrup and E. H. Immergut, John Wiley and Sons, 1989 (ISBN 0-471-81244-7) page VI/435.

The dimensions of P are:

$$\frac{\text{(quantity of permeant)} \times \text{(film thickness)}}{\text{(area)} \times \text{(time)} \times \text{(pressure drop across the film)}} \text{ or } \frac{cm^3(STP) \cdot cm}{cm^2 \cdot s \cdot Pa},$$

wherein STP means Standard Temperature and Pressure (273.15° K. and 1.013 10⁵ Pa). The "water vapour permeability coefficient is measured according the appropriate ASTM-standard.

Examples of suitable polymers for use in the layer A are polyethylene, both low and high density, polypropylene, poly(tetrafluoroethylene), poly(tetrafluoroethylene-co-hexafluoropropene), poly(tetrafluoroethylene-co-ethylene), poly(trifluorochloroethylene-co-ethylene), poly(vinylfluoride), butyl rubber, nylon 6, poly(vinylidenechloride), poly(p-xylylene), poly(p-2-chloroxylylene), poly(p-2,6-dichloroxylylene) and fluoro substituted poly(p-xylylene).

Preferred polymers for use in the preparation of the layer A of a phosphor panel of the present invention are high density polyethylene, poly(vinylidenechloride), poly(p-xylylene), poly(p-2-chloroxylyle-ne), poly(p-2,6-dichloroxylylene) and fluoro substituted poly(p-xylylene).

Most preferred polymers for use in the protective layer of the present invention are vacuum deposited, preferably chemical vacuum deposited poly-p-xylylene film. A poly-p-xylylene has repeating units in the range from 10 to 10000, wherein each repeating unit has an aromatic nuclear group, whether or not substituted. Each substituent group, if present, can be the same or different and can be any inert organic or inorganic group which can normally be substituted on aromatic nuclei. Illustrations of such substituent groups are alkyl, aryl, alkenyl, amino, cyano, carboxyl, alkoxy, hydroxylalkyl, carbalkoxy and similar groups as well as inorganic ions such as hydroxyl, nitro, halogen and other similar groups which are normally substitutable on aromatic nuclei. Particularly preferred substituted groups are those simple hydrocarbon groups such as the lower alkyl such as methyl, ethyl, propyl, butyl, hexyl and halogen groups particularly chlorine, bromine, iodine and fluorine as well as the cyano group and hydrogen.

A phosphor panel according to the present invention is thus provided with a layer A, adjacent to the said phosphor layer and comprises a layer of parylene.

As a basic agent the commercially available di-p-xylylene composition sold by the Union Carbide Co. under the trademark "PARYLENE" is thus preferred. The preferred compositions for the protective moistureproof protective layer covering the phosphor screens or panels thus are the unsubstituted "PARYLENE N", the monochlorine substituted "PARYLENE C", the dichlorine substituted "PARYLENE D" and the "PARYLENE HT" (a completely fluorine substituted version of PARYLENE N, opposite to the other "parylenes" resistant to heat up to a temperature of 400° C. and also resistant to ultra-violet radiation, moisture resistance being about the same as the moisture resistance of "PARYLENE C": see the note about "High Performance Coating for Electronics Resist Hydrocarbons and High Temperature" written by Guy Hall, Specialty Coating Systems, Indianapolis, available via www.scscookson.com. Technology Letters have also been made available by Specialty Coating Systems, a Cookson Company, as e.g. the one about "Solvent Resistance of the parylenes", wherein the effect of a wide variety of organic solvents on parylenes N, C, and D was investigated.

It has been found now that the phosphor panel according to the present invention preferably has a parylene, wherein said parylene is selected from the group consisting of parylene C, parylene D and parylene HT.

Most preferred polymers for use in the preparation of the layer A of a phosphor panel of the present invention are poly(p-2-chloroxylyle-ne), i.e. PARYLENE C film, poly(p-2,6-dichloroxylylene), i.e. PARYLENE D film and "PARYLENE HT" (a completely fluorine substituted version of PARYLENE N.

Parylene is available from a variety of sources and is commonly used for protecting printed circuit boards, sensors, and other electronic and electrical devices. Although the specific manner in which the parylene is applied to the phosphor layer forms no part of the present invention, it is preferred to apply the parylene layer by chemical vapour deposition (CVD) A method for doing so is disclosed in European Application 01000401.8 filed on 23, Aug. 2001. The process of deposition proceeds basically as follows:

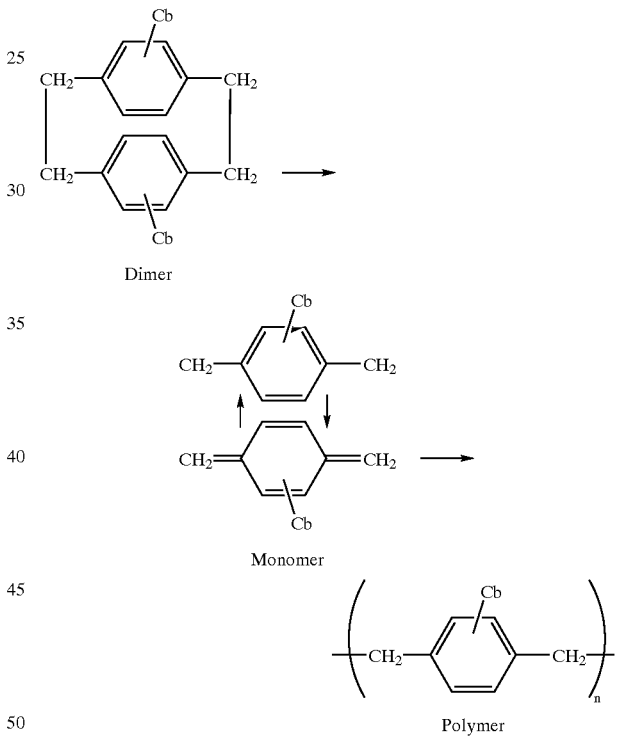

Dimer

Monomer

Polymer

A suitable dimer,—e.g. (cyclo-di(p-xylene) for the deposition of PARYLENE N, cyclo-di(p-2-chloroxylene) for the deposition of PARYLENE C or cyclo-di(p-2,6-dichloroxylene) for the deposition of PARYLENE D),—is heated and decomposes in two radicals. These radicals are deposited on the phosphor layer where they polymerize and form a polymeric layer. The chemical vapour deposition of the parylene layer (either PARYLENE N, C or D) has several advantages the layer is deposited without pinholes the barrier layer is not only deposited on the main surface of the phosphor layer, but also on the edges so that the sealing of the phosphor layer is complete.

Preferably the layer A, in a phosphor panel of the present invention, is immediately adjacent to the phosphor layer.

The layer A, in a phosphor panel of the present invention has preferably a thickness in the range between 0.05 µm and 15 µm, and more preferably in the range between 1 µm and 10 µm.

The layer B in a Phosphor Screen of the Present Invention

The layer B in a phosphor screen of the present invention can be any polymeric layer known in the art of applying a protective layer to a phosphor screen. The layer B can be coated onto the phosphor panel by directly applying thereto a coating solution containing a film-forming organic solvent-soluble polymer such as nitrocellulose, ethylcellulose or cellulose acetate or poly(meth)acrylic resin and removing the solvent by evaporation. According to another technique a clear, thin, tough, flexible, dimensionally stable polyamide film is bonded to the phosphor panel as described in published EP-A-392 474.

In a preferred embodiment, the layer B is produced with a radiation-curable composition. A phosphor panel according to the present invention is thus provided with a layer B which is a radiation cured polymeric layer.

Use of a radiation curable coating as protective top layer in an X-ray conversion screen is described e.g. in EP-A-209 358 and JP-A-86 176 900 and U.S. Pat. No. 4,893,021. For example, the protective layer comprises a UV cured resin composition formed by monomers and/or prepolymers that are polymerized by free-radical polymerisation with the aid of a photoinitiator. The monomeric products are preferably solvents for the prepolymers used.

Very useful radiation curable compositions for forming a protective coating according to the present invention contain as primary components: (1) a crosslinkable prepolymer or oligomer or a mixture of crosslinkable prepolymers or oligomers, (2) a reactive diluent monomer or mixture of reactive diluent monomers, and (3) in the case of a UV curable formulation a photoinitiator. The usual amounts of these primary components calculated on the total coating composition are 30–100% by weight for the prepolymer, 10–70% by weight for the reactive diluent and 0–10% by weight for the photoinitiator. Optionally minor amounts (e.g. 5% by weight) of non-reactive organic solvent for the prepolymer may be present.

Although any radiation curable composition known in the art, as e.g., the composition disclosed in EP-A-510 753 can be useful, it can be very beneficial *to have a coating solution containing fluorinated compounds so that the finished protective layer comprises at least 1% mol/mol of fluorinated moieties. Preferably the coating composition is so that the finished protective layer comprises between 5% and 50% (mol/mol) of fluorinated moieties.

The fluorinated moieties can be present either in said crosslinkable prepolymer or oligomer or in said reactive diluent monomer or in both. Preferably the fluorinated moieties are added by using as diluent monomer a fluorinated monomer or by adding a fluorinated monomer to the mixture of diluent monomers. Very useful fluorinated monomers for adding fluorinated moieties to the protective layer of a storage panel of the present invention are, e.g.,
$C_8F_{17}CH_2CH_2N(CH_3)COCH=CH_2$,
$C_8F_{17}CH_2CH_2OCOCH=CH_2$, $C_6F_{13}C_2H_{45}COCH=CH_2$,
$C_7F_{15}CH_2OCOC(CH_3)=CH_2$, $C_8F_{17}SO_2N(C_2H_5)C_2H_4NHCOCH=CH_2$, $(CF_3)_2CF(CF_2)_8C_2H_2SCOC(CH_3)=CH_2$, $C_8F_{17}SO_2N(CH_3)C_2H_4COOCH=CH_2$,
$C_6F_{13}CH_2CH_2OOCC(=CH_2)COOCH_2CH_2C_6F_{13}$,
$C_7F_{15}CH_2OOCCH=CHCOOCH_2C_7F_{15}$, $C_6F_{13}C_2H_4N(CH_2CH_2OH)COCO=CH_2$, $C_7F_{15}CON(C_2H_5)C_3H_6SCOC(CH_3)=CH_2$, $C_6F_{13}CH_2NHCOCO=CH_2$,
$C_8F_{17}CH_2CH_2OCH=CH_2$, $(CF_3)_2CF(CF_2)_6CH_2CH(OH)CH_2OCOCH=CH_2$, $(CH_3)_2CFOC_2F_4OCOCH=CH_2$,
$C_8F_{17}C_2H_4SO_2N(C_3H_7)C_2H_4OCOCH=CH_2$,
$C_7F_{15}C_2H_4CONHC_4H_8OCOCH=CH_2$

$C_7F_{15}COOCH_2C(CH_3)_2CH_2OCOC(CH_3)=CH_2$,
$C_8F_{17}SO_2N(C_2H_5)C_4H_8OCOCH=CH_2$, $(C_3F_7)_2C_6H_3SO_2N(CH_3)C_2H_4OCOCH=CH_2$,
$C_8F_{17}CF=CHCH_2N(CH_3)C_2H_4OCOCH=CH_2$,
$C_8F_{17}SO_2N(C_2H_5)C_2H_4NHCOCH=CH_2$, $C_8F_{17}SO_2N(CH_3)C_2H_4OCOCH=CH_2$, $C_8F_{17}SO_2N(C_2H_5)C_2H_4OCOC(CH_3)=CH_2$, $C_8F_{17}SO_2N(CH_3)CH_2C_6H_4CH=CH_2$,
$C_8F_{17}C_2H_4SO_2N(C_3H_7)C_2H_4OCOCH=CH_2$, $C_8F_{17}SO_2N(C_2H_5)C_4H_8OCOCH=CH_2$, and $(C_3F_7)_2C_6H_3SO_2N(CH_3)C_2H_4OCOCH=CH_2$ and combinations thereof.

As said above, the fluorinated monomers can be used as diluent monomer(s) or can be used in combination with non-fluorinated diluent moieties. Very useful non-fluorinated diluent monomers for use in the present invention are : methyl (metha)acrylate, ethyl acrylate, butyl acrylate, 2-ethylhexyl methacrylate, 2-hydroxyethyl acrylate, 2-hydroxyethyl methacrylate, glycidyl methacrylate, n-hexyl acrylate, lauryl acrylate, tetrahydrofurfurylmethacrylate and the like.

When the fluorinated moieties are present in the crosslinkable prepolymer or oligomer then preferably a mixture of fluorinated and non-fluorinated prepolymers is used. Examples of fluorinated prepolymers—useful to bring fluorinated moieties in the protective layer of the present invention—are ,e.g., fluorinated polyester acrylates wherein the polyester includes fluorinated moieties brought in the polyester via fluorinated di- or poly-ols or via fluorinated di- or poly-carboxylic acid. Very suitable fluorinated diols and polyesters derived therefrom are those described in, e.g., U.S. Pat. No. 4,957,986, U.S. Pat. No. 5,004,790 and U.S. Pat. No. 5,109,103. Examples of suitable diols are, e.g., 3,3,4,4,5,5,6,6-octafluorooctan-1,8-diol, or 2,2,3,3-tetrafluoro-1,4-butanediol, most suitable diols are diols with formula $HOCH_2(CF_2)_nCH_2OH$, wherein $2 \leq n \leq 10$. Suitable fluorinated poly- or diacids are those corresponding to the formula $HOOC(CF_2)_nCOOH$ or the methylesters thereof. Also terephthalic acid carrying —O—$(CH_2)_{10}$—$(CF2)_9$—$CF_3$ as a side group can be used to produce a fluorinated prepolymer useful in a screen of the present invention. In both cases the polyester can then be functionalized with acrylates as described in EP-A-207 257. It is also possible to introduce the fluorinated moieties via the acrylation step; when using polyesters as described in, e.g., EP-A-207 257, these are functionalized by using fluorinated acrylates, as those shown above.

When fluorinated prepolymers or oligomers are used, these can be mixed with non-fluorinated prepolymers or oligomers. Examples of suitable non-fluorinated prepolymers for use in a radiation-curable composition applied according to the present invention are the following unsaturated polyesters, e.g. polyester acrylates; urethane modified unsaturated polyesters, e.g. urethane-polyester acrylates. Liquid polyesters having an acrylic group as a terminal group, e.g. saturated co-polyesters which have been provided with acrytype end groups are described in published EP-A-207 257.

When the radiation-curing is carried out with ultraviolet radiation (UV), a photoinitiator is present in the coating composition to serve as a catalyst to initiate the polymerisation of the monomers and their optional cross-linking with the pre-polymers resulting in curing of the coated protective layer composition. A photosensitizer for accelerating the effect of the photoinitiator may be present.

Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethyl-benzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; etc..

A particularly preferred photoinitiator is 2-hydroxy-2-methyl-1-phenyl-propan-1-one which product is marketed by E. Merck, Darmstadt, Germany under the trade name DRACUT 1173.

The above mentioned photopolymerisation initiators may be used alone or as a mixture of two or more.

Examples of suitable photosensitizers are particular aromatic amino compounds as described e.g. in GB-P 1,314,556, 1,486,911, U.S. Pat. No. 4,255,513 and merocyanine and carbostyril compounds as described in U.S. Pat. No. 4,282,309. To the radiation-curable coating composition there may be added a storage stabilizer, a colorant, and other additives, and then dissolved or dispersed therein to prepare the coating liquid for the protective layer. In addition to these primary components additives may be present, e.g. surfactants, solid lubricants, e.g. waxes, de-foamers and plasticizers.

It is preferred that the layer B of a phosphor panel of the present invention is an outermost layer with good abrasion properties. The abrasion properties of the layer B are tested in a Taber abrasion test using a TELEDYNE TABER 5130 Abraser (trade name of taber Industries, New York, USA) with rotation elements CALIBRASE CS10F, sandpaper P220, load 250 g on each element. The percentage thickness loss of the layer B can be measured after 500 cycles. Preferably the layer B looses in the test above at most 25% of its thickness. In a more preferred embodiment in the phosphor panel according to the present invention the layer B is an outermost layer and has a thickness, t, and looses in a Taber abrasion test (sandpaper P220, load 250 g, 500 cycles, see test above) at most 20% of its thickness and even more preferably at most 15%.

If desired or required, the layer B of the present invention may include spacing particles for further increasing the transportability and adjusting the electrostatic properties. Suitable spacing agents in the form of friction reducing polymer beads selected from the group consisting of solid polystyrene, solid polyalkylene and a solid organic fluorinated polymer. Preferably the spacing agents are beads incorporating fluorinated moieties. Such beads have been described in U.S. Pat. No. 4,059,768. In the construction of the scanning apparatus used for reading storage phosphor screens the trend is towards more and more compact apparatus, so that the distance between the (moving) storage phosphor screen and mechanical (moving) parts of the scanner can become very low (between e.g., 10 to 100 $\mu$m). When then a storage phosphor screen with a layer B according to the present invention has protruding beads it is important that the beads do not touch mechanical parts of the scanner and that this is true even when the storage panel shows some wobble during transport in the scanner. Therefore beads used as spacing particles in a storage phosphor screen of the present invention preferably have a median volume diameter, $d_{v50}$, so that 5 $\mu$m$\leq$dv50$\leq$25 $\mu$m and a median numeric diameter, $d_{n50}$, so that $1 \leq d_{v50}/d_{n50} \leq 1.20$. Further the beads are preferably adapted to the thickness, t, of the layer B on the storage panel of the present invention so that and said polymeric beads have a median volume diameter, $d_{v50}$, so that $1.25 \leq d_{v50}/t \leq 4.0$.

The Phosphor Layer in a Phosphor Panel of the Present Invention

The phosphor layer in a panel of the present invention may comprise any phosphor known in the art, it can be a prompt emitting phosphor as well as a photostimulable phosphor. The phosphor layer in a panel according to the present invention can be a layer including a phosphor mixed in a polymer binder as well a binderless phosphor layer. A phosphor panel with a protective layer according to the present invention may comprise a hygroscopic phosphor. Preferably the phosphor layer in a phosphor panel of the present invention comprises a photostimulable-phosphor, and even more preferably the phosphor layer is a binderless phosphor layer. Among the binderless phosphor layers a phosphor layer comprising needle shaped phosphor particles, separated by voids, of CsX:Eu phosphor, wherein X represents a halide selected from the group consisting of Br and Cl, is most preferred as phosphor layer in the present invention. When on such a phosphor layer with needle shaped phosphor crystals, separated by voids, a layer A with very low water permeability is deposited, it is preferred that this layer A be a chemical vacuum deposited parylene layer, while such a layer not only covers the surface of the needle crystals, but also enters the voids between the needles and covers the edges providing a thorough humidity protection of the phosphor.

A phosphor panel of the present invention may also comprise edge reinforcements as the ones described in e.g. U.S. Pat. No. 5,334,842 and U.S. Pat. No. 5,340,661, that both are incorporated herein by reference.

A phosphor panel of the present invention can be a self-supporting panel as well as a panel comprising a support. This support can be any support known in the art, but in view of the desired high humidity resistance of the screens, a support with very low water vapour permeability is preferably used. A preferred support is a support of anodized aluminium and the supports as disclosed in EP-Application Nos. 010001696 and 01000697, both filed Dec. 3, 2001.

In a particular embodiment of the invention—shown in FIG. 1A—the surface of the phosphor layer (2) is smaller than the surface of the support (1) so that the phosphor layer does not reach the edges of the support. Thus a panel with a support having a surface larger than the main surface of the phosphor layer, so that the phosphor layer leaves a portion of the support free, and wherein the protective layer comprising layer A (3) and layer B (4) covers at least a part the portion of the support left free by the phosphor layer is a preferred embodiment of the present invention. An advantage of such a construction resides in the fact that the edges of the phosphor layer do, during use of the panel, e.g. during transport in the scanner, not touch mechanical parts of the apparatus and are thus less easily damaged. Although such a construction of a phosphor panel wherein the surface of the phosphor layer is smaller than the surface of the support so that the phosphor layer does not reach the edges of the support is a specific embodiment of the present invention, such a construction can be beneficial for the manufacturing any phosphor panel covered with any protective layer known in the art.

The invention moreover encompasses a method for the preparation of a phosphor panel comprising the steps of:
- providing a support
- applying a phosphor layer on said support,
- applying a layer A having a water permeability coefficient, P, so that $$0 \leq P \leq 1 \times 10^{-11} \frac{cm^3(STP) \cdot cm}{cm^2 \cdot s \cdot Pa},$$

on said phosphor layer
- applying a layer B, on said layer A and
- optionally applying an edge reinforcement.

The present invention moreover includes a method for the preparation of a binderless phosphor panel comprising the steps of:
- providing a support,
- vapour depositing a CsX:Eu phosphor, wherein X represents a halide selected from the group consisting of Br and Cl, forming a binderless phosphor layer on said support,
- applying a layer of parylene on said binderless phosphor layer by chemical vapour deposition, thereby forming a layer A;
- applying a radiation curable solution on top of said layer A, and curing it by UV and/or electron beam exposure forming layer B, and—optionally—applying an edge reinforcement.

EXAMPLES

1. The Screens

CsBr:Eu screens were made via thermal vapour deposition of CsBr and EuOBr. Therefore CsBr was mixed with EuOBr and placed in a container in a vacuum deposition chamber. The phosphor was deposited on a glass disk with a thickness of 1.5 mm and a diameter of 40 mm. The distance between the container and the substrate was 10 cm.

During evaporation, the substrate was rotated at 12 r.p.m.. The container with starting materials was heated to a temperature of 750° C. Before starting evaporation the chamber was evacuated to a pressure of $4.10^{-5}$ mbar. During the evaporation process, Ar was introduced in the chamber; the temperature of the substrate was 150° C. and the Ar-pressure 2.2 Pas.

The Eu-concentration in the evaporated screens was measured with X-ray fluorescence and was of the order of 800 p.p.m.

The screen was divided in four portions in order to prepare 4 test screens:

1. On the first portion NO protective layer was applied.
2. On the second portion a radiation curable solution was applied by screen printing and then electron beam cured in order to produce a protective layer having a thickness of 10 μm (=layer B of the present invention). The solution was composed of 47.5 wt % of EBECRYL 264 (trade name product from UCB, Belgium) for an aliphatic urethane triacrylate, 20 wt % of EBECRYL 1290 (trade name product from UCB, Belgium) for a hexafunctional aliphatic urethane acrylate), 29.5 wt %, of hexanedioldiacrylaat, and 3 wt % of MODAFLOW (trade name product from Monsanto).
3. On the third portion a layer of Parylene C was deposited by chemical vapour deposition in a well known Gorham Process, in order to give a layer of 8 μm thickness (=layer A of present invention).
4. On the fourth portion a layer of Parylene C as on the third portion was applied and on top of it a radiation cured layer as on the second portion. In this screen both the layer A and B of the present invention are thus present.

The quality of the screens was tested by immersing the four test screens in water for 24 hours, checking the physical integrity of the screen and, where possible, the speed performance. Moreover the strength of the surface was tested with a TELEDYNE TABER 5130 Abraser with rotation elements CALIBRASE CS10F, sandpaper P220, load 250 g on each element. The percentage of thickness loss of the layers was measured after 500 cycles. Results have been summarized in Table 1 hereinafter.

TABLE 1

| Screen # | Layer A | Layer B | After 24 hours in water | Thickness loss (Taber) |
|---|---|---|---|---|
| 1 | NO | NO | Phosphor layer dissolved | not relevant |
| 2 | NO | YES | Phosphor layer damaged | 10% |
| 3 | YES | NO | Screen intact | 100% |
| 4 | YES | YES | Screen intact | 10% |

What is claimed is:

1. A phosphor panel comprising a phosphor layer and a protective layer, wherein the phosphor layer has a main surface and edges, characterized in that said protective layer is divided in at least two layers:
   - a layer A, being closest to said phosphor layer and
   - a layer B farther away from said phosphor layer;
   and wherein said layer A has a lower water vapour permeability coefficient than said layer B wherein said layer A has a water vapour permeability coefficient, P, so that $$0 \leq P \leq 1 \times 10^{-11} \frac{cm^3(STP) \cdot cm}{cm^2 \cdot s \cdot Pa}$$

and wherein said layer A is adjacent to the said phosphor layer and contains a layer of parylene.

2. A phosphor panel according to claim 1, wherein said layer B is an outermost layer and has a thickness, t, and looses in a Taber abrasion test (sandpaper P220, load 250 g, 500 cycles) at most 25% of said thickness t.

3. A phosphor panel according to claim 2, wherein said layer A is adjacent to the said phosphor layer and contains a layer of parylene.

4. A phosphor panel according to claim 3, wherein said parylene is selected from the group consisting of parylene C, parylene D and parylene HT.

5. A phosphor panel according to claim 2 wherein said layer A has a thickness in the range between 0.05 μm and 15 μm.

6. A phosphor panel according to claim 2, wherein said layer B is a radiation cured polymeric layer.

7. A phosphor panel according to claim 1, wherein said parylene is selected from the group consisting of parylene C, parylene D and parylene HT.

8. A phosphor panel according to claim 1, wherein said layer A has a thickness in the range between 0.05 μm and 15 μm.

9. A phosphor panel according to claim 8, wherein said parylene is selected from the group consisting of parylene C, parylene D and 5 parylene HT.

10. A phosphor panel according to claim 1, wherein said layer B is a radiation cured polymeric layer.

11. A phosphor panel according to claim 1, wherein said layer A has a thickness in the range between 0.05 μm and 15 μm.

12. A phosphor panel according to claim 1, wherein said layer B is a radiation cured polymeric layer.

13. A phosphor panel according to claim 1, wherein said phosphor layer is a photostimulable phosphor layer.

14. A phosphor panel according to claim 13, wherein said panel comprises a binderless photostimulable phosphor layer.

15. A phosphor panel according to claim 14, wherein said binderless photostimulable phosphor layer contains a CsX:Eu stimulable phosphor, wherein X represents a halide selected from the group consisting of Br and Cl.

* * * * *

UNITED STATES PATENT AND TRADEMARK OFFICE
CERTIFICATE OF CORRECTION

PATENT NO. : 6,822,243 B2
DATED : November 23, 2004
INVENTOR(S) : Rudi Van den Bergh et al.

It is certified that error appears in the above-identified patent and that said Letters Patent is hereby corrected as shown below:

Title page,
Item [73], Assignee, change from"AGVA-Gevaert" to -- AGFA-Gevaert --

Signed and Sealed this

Twelfth Day of April, 2005

JON W. DUDAS
*Director of the United States Patent and Trademark Office*